(12) United States Patent
Katto et al.

(10) Patent No.: US 9,236,039 B2
(45) Date of Patent: Jan. 12, 2016

(54) VIRTUAL INSTRUMENT PLAYING SCHEME

(71) Applicant: Empire Technology Development LLC, Wilmington, DE (US)

(72) Inventors: Jiro Katto, Yokohama (JP); Tomohisa Ogawa, Saitama (JP)

(73) Assignee: Empire Technology Development LLC, Wilmington, DE (US)

( * ) Notice: Subject to any disclaimer, the term of this patent is extended or adjusted under 35 U.S.C. 154(b) by 26 days.

(21) Appl. No.: 14/002,595

(22) PCT Filed: Mar. 4, 2013

(86) PCT No.: PCT/US2013/028807
§ 371 (c)(1),
(2) Date: Aug. 30, 2013

(87) PCT Pub. No.: WO2014/137311
PCT Pub. Date: Sep. 12, 2014

(65) Prior Publication Data
US 2015/0143976 A1    May 28, 2015

(51) Int. Cl.
*G10H 1/18* (2006.01)
*G10H 7/00* (2006.01)
(Continued)

(52) U.S. Cl.
CPC *G10H 1/18* (2013.01); *A63F 13/00* (2013.01); *A63F 13/211* (2014.09);
(Continued)

(58) Field of Classification Search
USPC .......................................................... 84/615
IPC ...................................................... G10H 1/18
See application file for complete search history.

(56) References Cited

U.S. PATENT DOCUMENTS 5,902,949 A * 5/1999 Mohrbacher .................... 84/609
6,072,809 A    6/2000 Agrawal et al.
(Continued)

FOREIGN PATENT DOCUMENTS

JP    H0844367 A    2/1996
JP    2006195386 A    7/2006
(Continued)

OTHER PUBLICATIONS

"Guitar Hero 3 Wii guitar features," accessed at https://www.youtube.com/watch?v=B0T_mq5Owwl, uploaded on Oct. 18, 2007, 3 pages.
(Continued)

*Primary Examiner* — David Warren
(74) *Attorney, Agent, or Firm* — Brundidge & Stanger, P.C.

(57) ABSTRACT

Technologies are generally described for a virtual instrument playing system. In some examples, a virtual instrument playing system may include a sensor data receiving unit configured to receive first sensor data of a first user and second sensor data of the first user, a sound event prediction unit configured to detect a sound event of the first user and to predict a sound generation timing corresponding to the sound event of the first user based at least in part on the first sensor data of the first user, an instrument identification unit configured to identify a virtual instrument corresponding to the sound event from one or more virtual instruments based at least in part on the second sensor data of the first user, a sound data generation unit configured to generate sound data of the first user regarding the identified virtual instrument based at least in part on the sound generation timing, and a video data generation unit configured to generate video data of the first user regarding the identified virtual instrument based at least in part on the second sensor data of the first user.

24 Claims, 9 Drawing Sheets

(51) Int. Cl.
*A63F 13/00* (2014.01)
*A63F 13/211* (2014.01)
*A63F 13/213* (2014.01)
*A63F 13/44* (2014.01)
*A63F 13/424* (2014.01)
*A63F 13/40* (2014.01)
*G10H 1/00* (2006.01)

(52) U.S. Cl.
CPC .............. *A63F 13/213* (2014.09); *A63F 13/40* (2014.09); *A63F 13/424* (2014.09); *A63F 13/44* (2014.09); *G10H 1/0008* (2013.01); *G10H 7/00* (2013.01); *G10H 2220/391* (2013.01); *G10H 2220/395* (2013.01); *G10H 2230/275* (2013.01)

(56) References Cited

U.S. PATENT DOCUMENTS

| | | | |
|---|---|---|---|
| 6,245,982 B1* | 6/2001 | Suzuki et al. | 84/477 R |
| 6,310,279 B1* | 10/2001 | Suzuki et al. | 84/600 |
| 6,331,851 B1* | 12/2001 | Suzuki et al. | 345/419 |
| 6,482,087 B1 | 11/2002 | Egozy et al. | |
| 7,820,902 B2 | 10/2010 | Furukawa et al. | |
| 7,889,653 B2 | 2/2011 | Grob-Lipski | |
| 8,222,507 B1* | 7/2012 | Salazar et al. | 84/602 |
| 2004/0080507 A1* | 4/2004 | Von Prittwitz | 345/419 |
| 2006/0107819 A1* | 5/2006 | Salter | 84/470 R |
| 2007/0021207 A1* | 1/2007 | Ahdoot | 463/36 |
| 2007/0039452 A1* | 2/2007 | Nishida | 84/658 |
| 2007/0116301 A1* | 5/2007 | Suzuki | 381/106 |
| 2009/0003802 A1* | 1/2009 | Takai et al. | 386/124 |
| 2009/0100979 A1 | 4/2009 | Furukawa et al. | |
| 2011/0207513 A1* | 8/2011 | Cross et al. | 463/7 |
| 2011/0290098 A1* | 12/2011 | Thuillier | 84/645 |
| 2012/0007884 A1 | 1/2012 | Kim | |
| 2012/0165964 A1* | 6/2012 | Flaks et al. | 700/94 |
| 2012/0231862 A1* | 9/2012 | Yamamoto | 463/7 |
| 2013/0047823 A1 | 2/2013 | Tabata | |
| 2013/0255476 A1* | 10/2013 | Sakurai et al. | 84/723 |
| 2013/0262021 A1* | 10/2013 | Sakurai et al. | 702/141 |
| 2013/0262024 A1* | 10/2013 | Sakurai et al. | 702/150 |
| 2014/0244262 A1* | 8/2014 | Hisaminato | 704/258 |
| 2015/0059557 A1* | 3/2015 | Sakata et al. | 84/609 |
| 2015/0091859 A1* | 4/2015 | Rosenberg et al. | 345/174 |
| 2015/0094835 A1* | 4/2015 | Eronen et al. | 700/94 |
| 2015/0107443 A1* | 4/2015 | Yasuraoka | 84/615 |

FOREIGN PATENT DOCUMENTS

| | | |
|---|---|---|
| JP | 4244916 B2 | 3/2009 |
| JP | 2009098683 A | 5/2009 |
| JP | 2009116325 A | 5/2009 |

OTHER PUBLICATIONS

"Kinect for Windows," accessed at https://web.archive.org/web/20130303114726/http://www.microsoft.com/en-us/kinectforwindows/, Mar. 3, 2013, 1 page.

"Kinect," accessed at https://web.archive.org/web/20130303125510/http://en.wikipedia.org/wiki/Kinect, last modified on Mar. 1, 2013, 17 pages.

"Ltd. Solid Ray Institute / Muscle Talk," accessed at https://web.archive.org/web/20120419164438/http://www.solidray.co.jp/product/muscle/muscle_b.html, Apr. 19, 2012, 2 pages (Machine Translation).

"OSC Application Areas," accessed at https://web.archive.org/web/20120825140906/http://opensoundcontrol.org/book/export/html/4, Aug. 25, 2012, 5 pages.

"Wii Music Saxophone," accessed at https://www.youtube.com/watch?v=SwS1A0zxfmc, uploaded on Sep. 16, 2008, 2 pages.

"Wii Music," accessed at http://www.wiimusic.com./launch/?ref=, accessed on Feb. 5, 2015, 1 page.

Gillian, N., and Paradiso, J. A., "Digito: A Fine-Grained, Gesturally Controlled Virtual Musical Instrument," Nime, 4 pages (May 21-23, 2012).

Yamamoto, K., et al., "A Real-time Finger-tapping Interface Using High-speed Vision System," IEEE International Conference on Systems, Man and Cybernetics, SMC '06, pp. 296-303 (Oct. 8-11, 2006).

International Search Report from International Application No. PCT/US2013/028807 mailed Apr. 9, 2013.

V. Lympourides, et al. "Fully Wireless, Full Body 3-D Motion Capture for Improvisational Performances" WBI 2009, SIGCHI Workshop on Whole Body Interaction 2009, Apr. 5, 2009.

T. Ogawa, et al., "Percussion Instrument Interface Using Sensor Fusion" FIT 2011.

T. Ogawa, et al., "Improvement of Sound Output Timing in Percussion Interface Using Gyro Sensor", IEICE General Conference, Mar. 2011.

H. Schulzrinne et al.: "RTP: A Transport Protocol for Real-Time Applications," IETF RFC 3550, Jul. 2003.

ISO/IEC JTC1/SC29/WG11, "Information Technology—Generic Coding of Moving Pictures and Associated Audio: Systems", ISO/IEC 13818-1/ITU-T Rec. H.222.0, 1995.

D. Mills et al.: "Network Time Protocol Version 4: Protocol and Algorithms Specification," IETF RFC 5905, Jun. 2010.

Bott, et al., "Exploring 3D Gestural Interfaces for Music Creation in Video Games", 2009.

Goto, et al., "Open RemoteGIG: An Open-to-the-Public Distributed Session System overcoming Network Latency," IPSJ Journal, vol. 43, No. 2, Feb. 2002.

Hikichi, K., "The Evaluation of Delay Jitter for Haptics Collaboration over the Internet", pp. 1492-1496, 2002.

Komura, et al., "Imaging Systems Using High Speed Image Processing and Their Application", Journal of the Institute of Image Information and Television Engineers, vol. 65, No. 10, pp. 1376-1380, Oct. 2011.

W. Kim, et al., "A 1.5 Mpixel RGBZ CMOS Image Sensor for Simultaneous Color and range Image Capture", ISSCC 2012, 22.7, Feb. 2012.

\* cited by examiner

VIRTUAL INSTRUMENT PLAYING SCHEME

CROSS-REFERENCE TO RELATED APPLICATIONS

This Application is the National Stage filing under 35 U.S.C §371 of PCT Application Ser. No. PCT/US13/28807 filed on Mar. 4, 2013.

BACKGROUND

With the recent advances in information technology, it becomes possible to enjoy music in various ways. Further, recent game machines and user devices are equipped with various sensors, which allow development of games and applications in a more interactive way, and interactive music applications that utilize sensors are being developed.

SUMMARY

In an example, a virtual instrument playing system may include a sensor data receiving unit configured to receive first sensor data of a first user and second sensor data of the first user, a sound event prediction unit configured to detect a sound event of the first user and to predict a sound generation timing corresponding to the sound event of the first user based at least in part on the first sensor data of the first user, an instrument identification unit configured to identify a virtual instrument corresponding to the sound event from one or more virtual instruments based at least in part on the second sensor data of the first user, a sound data generation unit configured to generate sound data of the first user regarding the identified virtual instrument based at least in part on the sound generation timing, and a video data generation unit configured to generate video data of the first user regarding the identified virtual instrument based at least in part on the second sensor data of the first user.

In another example, a method performed under control of a virtual instrument playing system may include receiving first sensor data of a first user from a first device, receiving second sensor data of the first user from a second device, detecting a sound event based at least in part on the first sensor data of the first user, predicting a sound generation timing corresponding to the sound event of the first user based at least in part on the first sensor data of the first user, identifying a virtual instrument corresponding to the sound event from one or more virtual instruments based at least in part on the second sensor data of the first user, generating sound data of the first user regarding the identified virtual instrument based at least in part on the sound generation timing, and generating video data of the first user regarding the identified virtual instrument based at least in part on the second sensor data of the first user.

In yet another example, a computer-readable storage medium may store thereon computer-executable instructions that, in response to execution, cause a virtual instrument playing system to perform operations, including receiving first sensor data of a first user from a first device, receiving second sensor data of the first user from a second device, detecting a sound event based at least in part on the first sensor data of the first user, predicting a sound generation timing corresponding to the sound event of the first user based at least in part on the first sensor data of the first user, identifying a virtual instrument corresponding to the sound event from one or more virtual instruments based at least in part on the second sensor data of the first user, generating sound data of the first user regarding the identified virtual instrument based at least in part on the sound generation timing; and generating video data of the first user regarding the identified virtual instrument based at least in part on the second sensor data of the first user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
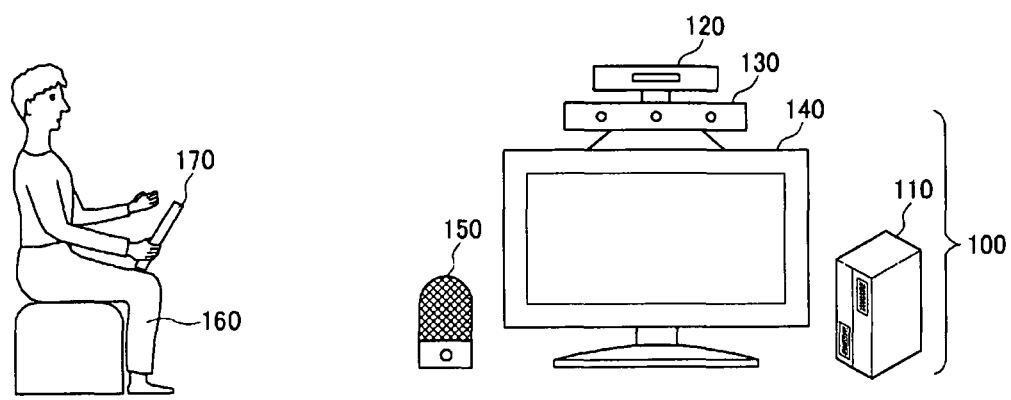
FIG. 1 schematically shows an illustrative example of an environment where a player plays a virtual instrument of a virtual instrument playing system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a virtual instrument playing scheme for a virtual instrument playing system which is connected to one or more other remote virtual instrument playing systems via a network. Further, technologies are herein generally described for predicting a sound event in a virtual instrument playing system and transmitting the sound event to a remote virtual instrument playing system via a network before the sound event actually occurs so that the performance in both virtual instrument playing systems are synchronized and also not affected by a delay on the network.

In some examples, a player of a virtual instrument playing system may play a virtual instrument, such as a virtual drum, which may be displayed as a computer graphics image on a display connected to the virtual instrument playing system. Further, the sound of the virtual instrument may be played on a speaker connected to the virtual instrument playing system. In such cases, the player may play the virtual instrument with a first device including a gyro sensor and an acceleration sensor (such as Wii® remote controller). Those sensors may detect the player's gestures, which will be transmitted to the virtual instrument playing system as a sensor data through a receiver. Further, the player's motions may be detected by a second device as a sensor data, which may include a video camera and a depth sensor (such as Kinect®) and is operatively connected to the virtual instrument playing system. The sensor data from the first device and the second device may be processed by the virtual instrument playing system for providing the player's performance on the display and the speaker.

Further, in some examples, the virtual instrument playing system may be connected to a remote virtual playing system via a network (such as a cloud). Such a network connection may allow the player of the virtual instrument playing system and another player of the other virtual instrument playing system to enjoy an interactive live session. However, a delay or latency may occur on the network, and such delay or latency may cause a sense of unnaturalness in the performance of both players. In such cases, the virtual instrument playing system may detect a sound event and predict a sound generation timing of the sound event before the actual sound event occurs. Sound data of the sound event (generated by the virtual instrument playing system) together with its timestamp (corresponding to the predicted sound generation timing) may be transmitted to the remote virtual instrument playing system before the actual sound event occurs. Those transmitted data may be utilized by the remote virtual instrument playing system to play the sound event of the virtual instrument playing system in a synchronized manner with any sound event of the remote virtual instrument playing system.

FIG. 1 schematically shows an illustrative example of an environment where a player plays a virtual instrument of a virtual instrument playing system, arranged in accordance with at least some embodiments described herein. As depicted, an entire configuration 100 may include a virtual instrument playing system 110, a receiver 120, a camera 130, a display 140 and a speaker 150. A player 160 may grab a gesture-sensing device 170 and make gestures and/or motions in front of entire configuration 100.

In some embodiments, virtual instrument playing system 110 may be a data processing device which includes a processor, a memory, an input/output interface and a network interface. By way of example, but not limitation, virtual instrument playing system 110 may include a desktop computer, a laptop computer, a workstation, or any kinds of computing devices. Further, virtual instrument playing system 110 may include a game console, such as, but not limited there to, Nintendo Wii®, PlayStation®, or XBOX®. Virtual instrument playing system 110 may run a program or an application for playing a virtual instrument. In some embodiments, such program or application may be stored in the memory of virtual instrument playing system 110 or in a cloud datacenter (not shown). Virtual instrument playing system 110 may receive sensor data from receiver 120 and/or camera 130 and process the sensor data on the program or application to output a video data to display 140 and an audio data to speaker 150. In some embodiments, virtual instrument playing system 110 may be connected to a network (not shown), through which virtual instrument playing system 110 may exchange data for playing the virtual instrument together with another virtual instrument playing system (not shown). The network configuration with the other virtual instrument playing system will be described more in detail with reference FIG. 2 below.

In some embodiments, receiver 120 may operatively connected to virtual instrument playing system 110 and may receive sensor data from gesture-sensing device 170. Gesture-sensing device 170 may include a gyro sensor and/or an acceleration sensor. As a non-limiting example, gesture-sensing device 170 may include Wii® remote controller. By way of example, but not limitation, when player 160 plays a virtual drum on virtual instrument playing system 110, he/she may move gesture-sensing device 170 up and down with his/her hand to perform the virtual drum. Then, the gyro sensor and/or the acceleration sensor of gesture-sensing device 170 may obtain angular velocity values of such movement, and those angular velocity values may be transmitted, through receiver 120, to virtual instrument playing system 110 as sensor data. The sensor data may include information regarding a sound event of the virtual drum. Virtual instrument playing system 110 may analyze the sensor data from gesture-sensing device 170 and detect the sound event. Further, virtual instrument playing system 110 may predict the sound generation timing of the sound event. The predicted sound generation timing may be transmitted to the other virtual instrument playing system via the network before the actual sound generation timing, and the other virtual instrument playing system may provide an interactive live session of both player 160 of virtual instrument playing system 110 and another player of the other virtual instrument playing system in synchronization. Such synchronized live session will be described below in more detail.

In some embodiments, camera 130 may operatively connected to virtual instrument playing system 110. By way of example, but not limitation, camera 130 may include an RGB camera and a depth camera. As a non-limiting example, camera 130 may be equipped with a skeleton tracking function, such as Kinect®. Camera 130 may obtain posture and motion of player 160 using the skeleton tracking function. That is, camera 130 may detect certain parts of the body of player 160, such as elbows and wrists, by using the skeleton tracking function to identify the posture and motion of player 160. The posture and motion information of player 160 may then be transmitted to virtual instrument playing system 110 as sensor data for instrument detection. In the instrument detection (i.e., detection of a virtual instrument, which will generate sound at each sound generation timing, among one or more virtual instruments for performance), virtual instrument playing system 110 may identify the virtual instrument based at least in part on the respective positions of the one or more virtual instruments and the sensor data from camera 130. Further, virtual instrument playing system 110 may generate video data of the performance based at least in part on the sensor data from camera 130 (which will be described later in more detail).

In some embodiments, display 140 may be operatively connected to virtual instrument playing system 110 and display the video data generated by virtual instrument playing system 110. As a non-limiting example, display 140 may include an LCD display, a PDP display, an OLED display, or any electronic display devices that can receive and display a digital video data. The video data may be a computer graphics image showing the one or more virtual instruments and an avatar of player 160. Player 160 may perform the one or more virtual instruments displayed on display 140 with gesture-sensing device 170. Further, in some embodiments, speaker 150 may be operatively connected to virtual instrument playing system 110 and play the sound data generated by virtual instrument playing system 110.

In some embodiments, gesture-sensing device 170 may include various sensors other than the gyro sensor and the acceleration sensor as described above. By way of non-limiting example, gesture-sensing device 170 may further include a vision sensor (such as an image sensor or a depth sensor) in order to improve spatial resolution. In some embodiments, in addition to camera 130, a high-speed camera may be further provided into entire configuration 100 in order to improve temporal resolution. The above various sensors implemented in gesture-sensing device 170 and/or the high-speed camera installed in entire configuration 100 may improve the precision of predicting the sound generation timing.

Figure 2:
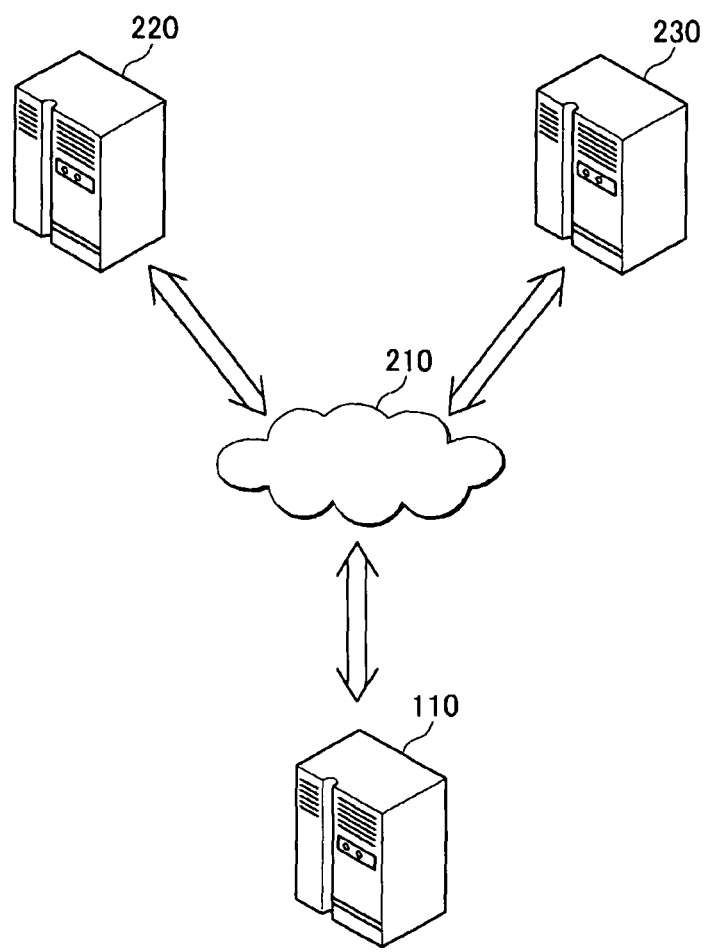
FIG. 2 schematically shows an illustrative example of a network environment where multiple virtual instrument playing systems are connected via a network, arranged in accordance with at least some embodiments described herein.

FIG. 2 schematically shows an illustrative example of a network environment where multiple virtual instrument playing systems are connected via a network, arranged in accordance with at least some embodiments described herein. As shown in FIG. 2, virtual instrument playing system 110, which was described with reference to FIG. 1 above, may be connected to a network 210. Further, a virtual instrument playing system 220 and a virtual instrument playing system 230 may be connected to network 210. Thus, exchange of data between those virtual instrument playing systems 110, 220 and 230 may be available via network 210.

By way of example, network 210 may include, but not limitation, a wired network such as LAN (Local Area Network), WAN (Wide Area Network), VAN (Value Added Network) or the like, or all kinds of wireless network such as a mobile radio communication network, a satellite network, a bluetooth, WiBro (Wireless Broadband Internet), Mobile WiMAX, HSDPA (High Speed Downlink Packet Access) or the like.

In some embodiments, network 210 may be a cloud datacenter which may store personal performance data. In such cases, the cloud datacenter may store thereon a model performance for a lesson and provide it to virtual instrument playing systems 110, 220 and 230 as reference data for exercise.

In some embodiments, player 160 of virtual instrument playing system 110 and another player of virtual instrument playing system 220 may perform an interactive live session through the network connection by network 210. In such cases, there can be a delay or latency in network 210 while exchanging data, and a sound data transmitted from virtual instrument playing system 110 to virtual instrument playing system 220 may be delayed by the delay or latency. Thus, a sound event performed by virtual instrument playing system 110 at a sound generation timing may not be accurately played by virtual instrument playing system 220 at the sound generation timing of the sound event, and this may cause a sense of unnaturalness in the interactive live session. In order to resolve such unnaturalness, virtual instrument playing system 110 may predict the sound generation timing of the sound event and transmit the sound data of the sound event to virtual instrument playing system 220 before the sound data is actually played in virtual instrument playing system 110, thereby synchronization of playing the sound data both in virtual instrument playing system 110 and virtual instrument playing system 220 may be obtained. Such prediction and synchronization will be described more in detail with reference to FIG. 3 below.

Figure 3:
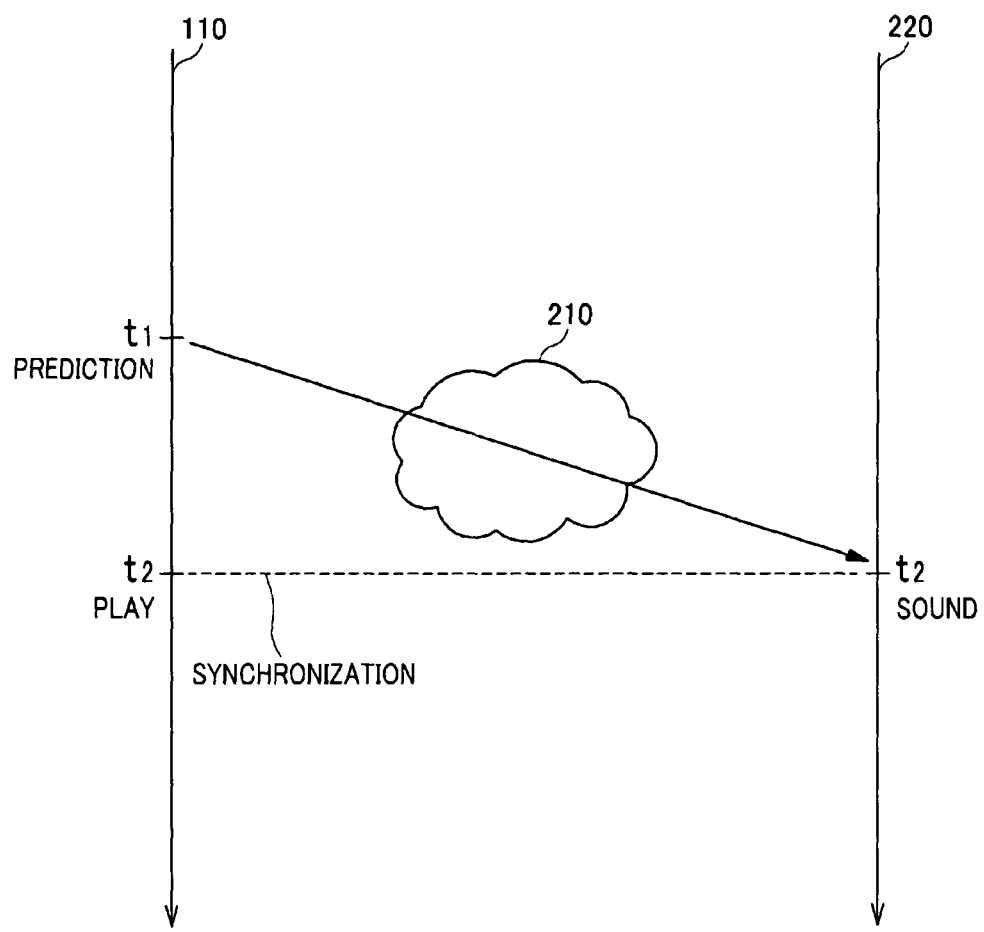
FIG. 3 schematically shows prediction and synchronization of a sound event in two virtual instrument playing systems which are connected via a network, arranged in accordance with at least some embodiments described herein.

FIG. 3 schematically shows prediction and synchronization of a sound event in two virtual instrument playing systems which are connected via a network, arranged in accordance with at least some embodiments described herein. In FIG. 3, the left arrow indicates a timing chart of the process in virtual instrument playing system 110 in which the time proceeds to the downward direction, and the right arrow indicates a timing chart of the process in virtual instrument playing system 220 in which the time proceeds to the downward direction.

As shown in FIG. 3, virtual instrument playing system 110 may predict, at $t_1$, a sound event which will occur at $t_2$. Further, virtual instrument playing system 110 may transmit to virtual instrument playing system 220 a sound data corresponding to the sound event together with the sound generation timing of $t_2$ via network 210. Then, virtual instrument playing system 220 may play the sound data at the sound generation timing of $t_2$ so that the play of the sound data both in virtual instrument playing systems 110 and 220 can be synchronized each other. In some embodiments, the time difference between the prediction timing of $t_1$ and the sound generation timing of $t_2$ may be the same with or longer than the latency in network 210 so that the sound data can be transmitted to virtual instrument playing system 220 before the sound generation timing. Such prediction may be performed based on several prediction methods including a pitch-based prediction method and a gradient-based prediction method. Those prediction methods will be described more in detail with reference FIG. 4 below.

Figure 4:
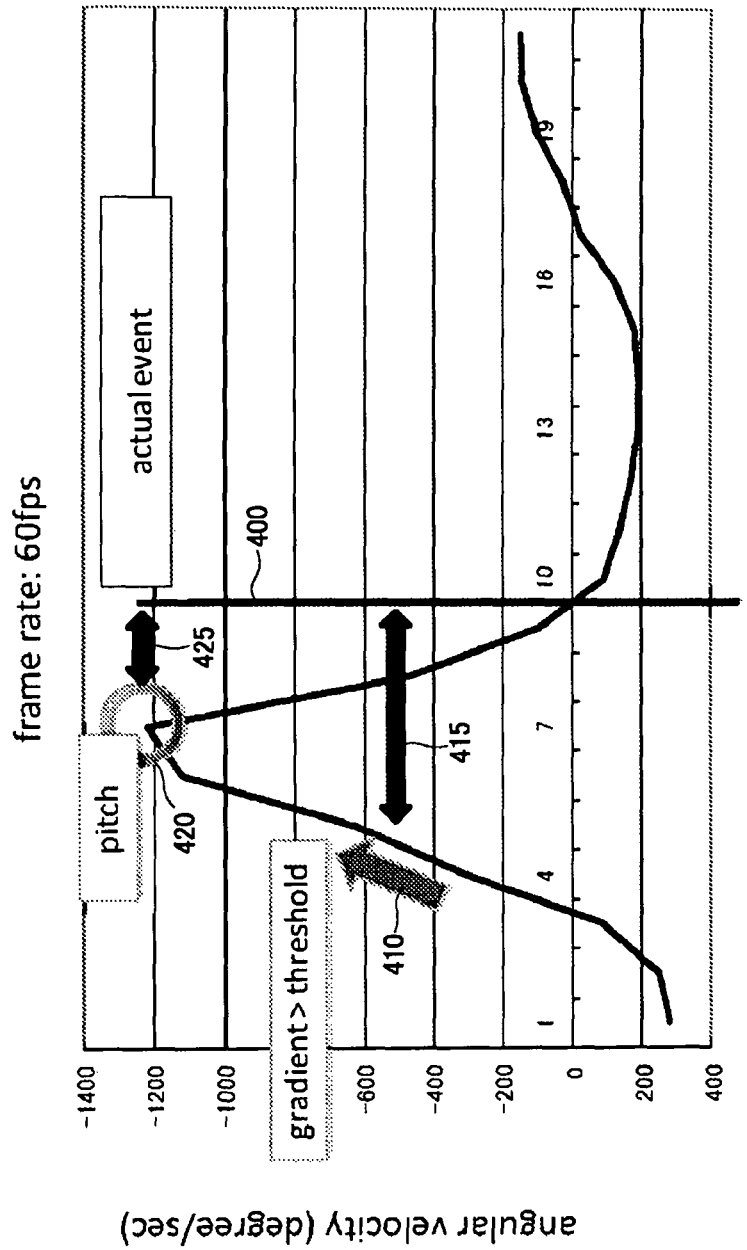
FIG. 4 shows an illustrative example timing chart of temporal changes in angular velocity detected by a gyro sensor during performance of a virtual instrument, arranged in accordance with at least some embodiments described herein.

FIG. 4 shows an illustrative example timing chart of temporal changes in angular velocity detected by a gyro sensor during performance of a virtual instrument, arranged in accordance with at least some embodiments described herein. In some embodiments, the virtual instrument may be a drum, i.e., a virtual drum, and entire configuration 100 and gesture-sensing device 170 described above with reference FIG. 1 may be used to obtain the angular velocity. In the timing chart, the horizontal axis represents time with each division corresponding to $1/60$ second, and the vertical axis represents the angular velocity observed. A steep rise in the angular velocity represents a swing-up movement of gesture-sensing device 170, and a steep fall in the angular velocity represents a swing-down movement of gesture-sensing device 170. The timing at which the angular velocity becomes zero after a fall represents a sound generation timing 400 of the virtual drum.

By way of example, but not limitation, conceivable ways of predicting sound generation timing 400 in advance based on the sensor data from gesture-sensing device 110 may include prediction based on detection of a pitch 420 (timing at which the angular velocity takes a maximum value) and prediction based on detection of a timing 410 at which an angular velocity gradient exceeds a predetermined threshold. The prediction accuracy may be higher with the pitch-based prediction using the maximum value, while there is a longer time margin before sound generation timing 400 with the gradient-based prediction (i.e., 415>425).

In some embodiments, in consideration of the above issue of tradeoff between the accuracy of prediction and the time margin before sound generation timing 400, it may be conceivable to employ a scheme in which the algorithm used for prediction of sound generation timing 400 is switched adaptively in accordance with the level of network delay observed. In this scheme, prediction based on detection of pitch 420 may be selected if the observed network delay is less than a time difference between the pitch and the sound generation timing 425, whereas prediction based on timing 410 at which the angular velocity gradient exceeds the predetermined threshold may be selected if the observed network delay is greater than time difference 425.

As non-limiting examples of specific values, time difference 425 between pitch 420 and sound generation timing 400 may be about 30 ms, and a time difference 415 between timing 410 (at which the angular velocity gradient exceeds the predetermined threshold) and sound generation timing 400 may be about 100 ms. It may be possible to realize smooth synchronized performance of the virtual drum as long as the network delay does not exceed 100 ms.

In some embodiments, similar prediction algorithms may be used with other sensors. However, the accuracy of prediction may depend on the resolutions of various sensors, such as their sampling periods. In the case of the sensors used in the configuration shown in FIG. 1, the sampling periods of the gyro sensor and the acceleration sensor included in gesture-sensing device 170 may be ¹⁄₁₀₀ second, and the sampling periods of the video camera and the depth camera included in camera 130 may be ¹⁄₃₀ second. Thus, higher prediction accuracy may be expected with the gyro sensor and the acceleration sensor.

Figure 5:
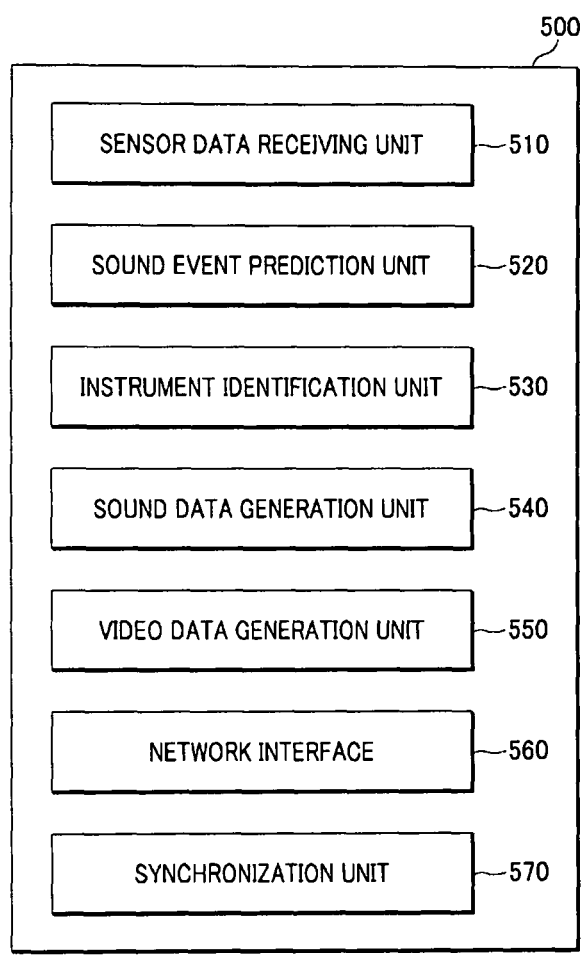
FIG. 5 shows a schematic block diagram illustrating an example architecture of a virtual instrument playing system, arranged in accordance with at least some embodiments described herein.

FIG. 5 shows a schematic block diagram illustrating an example architecture of a virtual instrument playing system, arranged in accordance with at least some embodiments described herein.

As depicted in FIG. 5, a virtual instrument playing system 500 may include a sensor data receiving unit 510, a sound event prediction unit 520, an instrument identification unit 530, a sound data generation unit 540, a video data generation unit 550, a network interface 560 and a synchronization unit 570. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Sensor data receiving unit 510 may be configured to receive first sensor data of a user of virtual instrument playing system 500 and second sensor data of the user. In some embodiments, the first sensor data may include angular velocity values obtained from a gesture-sensing device including a gyro sensor and/or an acceleration sensor (such as gesture-sensing device 170 in FIG. 1). The first sensor data of the user may be provided to sound event prediction unit 520 for predicting a sound generation timing corresponding to a sound event of the user, and this will be described later in more detail. In some embodiments, the second sensor data of the user may include skeleton data of the user obtained from a camera including an RGB camera and a depth camera (such as camera 130 in FIG. 1). The second sensor data of the user may be provided to instrument detection unit 530 for detecting a virtual instrument, among multiple virtual instruments, corresponding to the sound event of the user, and this will also be described later in more detail.

In some embodiments, the first sensor data and the second sensor data may be forwarded to an extended Kalman filter (not shown in FIG. 5), which may correct the first sensor data and the second sensor data and provide them to sound event prediction unit 520 and instrument identification unit 530, respectively.

Sound event prediction unit 520 may be configured to detect a sound event of the user and to predict a sound generation timing corresponding to the sound event of the user based at least in part on the first sensor data of the user. In cases in which the first sensor data include the angular velocity values, sound event prediction unit 520 may predict the sound generation timing based on either the pitch-based prediction or the gradient-based prediction as explained with reference FIG. 4 above. By way of example, but not limitation, sound event prediction unit 520 may include a sound event detection module, an event learning module and an event prediction module. The sound event detection module may detect the sound generation timing based on the first sensor data, and the event learning module may record the first sensor data together with the sound generation timing and perform user-adapted learning of changes in the first sensor data. Based on the results of the user-adapted learning, the event prediction module may predict the sound generation timing of the virtual instrument based at least in part on the first sensor data.

In some embodiments, sound event prediction unit 520 may adaptively switch/select a prediction algorithm from multiple prediction algorithms including the pitch-based prediction and the gradient-based prediction in accordance with the level of network delay observed, as explained with reference to FIG. 4 above. In such cases, sound event prediction unit 520 may include multiple prediction algorithms and a selector for selecting a prediction algorithm from the multiple prediction algorithms. Sound event prediction unit 520 may receive delay information of a remote user from network interface 560 (which will be further described below), and the selector may then select a prediction algorithm based on the delay information. The selected prediction algorithm may output predicted values of the sound generation timing.

Instrument identification unit 530 may be configured to identify a virtual instrument corresponding to the sound event from the multiple virtual instruments based at least in part on the second sensor data of the user of virtual instrument playing system 500. In cases in which the second sensor data include skeleton data of the user obtained from the camera including the RGB camera and the depth camera, instrument identification unit 530 may identify the virtual instrument corresponding to the sound event at each sound generation timing based on the positions of the multiple virtual instruments in a virtual scene and the skeleton data obtained by skeleton tracking.

Sound data generation unit 540 may be configured to generate sound data of the user of virtual instrument playing system 500 regarding the identified virtual instrument based at least in part on the sound generation timing. Further, video data generation unit 550 may be configured to generate video data of the user of virtual instrument playing system 500 regarding the identified virtual instrument based at least in part on the second sensor data of the first user.

Network interface 560 may be configured to exchange data packets with a remote virtual instrument playing system connected via a network (such as network 210 described above with reference FIG. 2 above). By way of example, but not limitation, network interface 560 may receive the sound data together with its timestamp from sound data generation unit 540 and the skeleton data of the user of virtual instrument playing system 500 together with its timestamp from sensor data receiving unit 510 (or from the extended Kalman filter, if it is included in virtual instrument playing system 500), and then send a data packet including those pieces of information to the remote virtual instrument playing system. Further, network interface 560 may receive, from the remote virtual instrument playing system, a data packet and may separate information contained in the data packet into sound data of the remote user (together with its timestamp) and skeleton data of the remote user (together with its timestamp). The sound data of the remote user and its timestamp may be forwarded to synchronization unit 570 for synchronized playing with the sound data of the user of virtual instrument playing system 500, and the skeleton data of the remote user and its timestamp may be forwarded to video data generation unit 550 for generating a combined video scene of the user of virtual instrument playing system 500 and the remote user of the remote virtual instrument playing system.

Synchronization unit 570 may be configured to generate a combined sound data of the sound data of the user of virtual instrument playing system 500 and the sound data of the remote user in synchronization based at least in part on the timestamp of the user of virtual instrument playing system 500 and the timestamp of the remote user. The combined sound data may then be transmitted to a sound interface (not shown) for playing the combined sound data, and the combined video scene may be transmitted to a video interface (not shown) for displaying the combined video scene.

Figure 6:
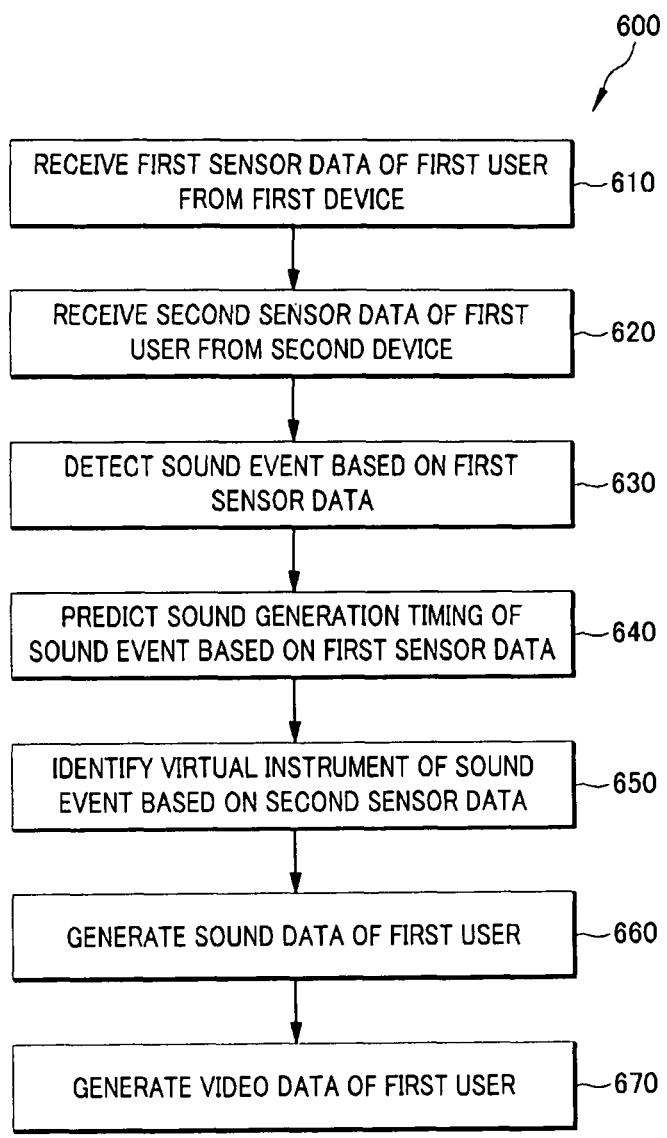
FIG. 6 shows an example flow diagram of a process for generating sound and video data for a virtual instrument playing scheme, arranged in accordance with at least some embodiments described herein.

FIG. 6 shows an example flow diagram of a process for generating sound and video data for a virtual instrument playing scheme, arranged in accordance with at least some embodiments described herein.

Process 600 may be implemented in a virtual instrument playing system such as virtual instrument playing system 500 including sensor data receiving unit 510, sound event prediction unit 520, instrument identification unit 530, sound data generation unit 540, video data generation unit 550, network interface 560 and synchronization unit 570. Process 600 may include one or more operations, actions, or functions as illustrated by one or more blocks 610, 620, 630, 640, 650, 660 and/or 670. Although illustrated as discrete blocks, various blocks may be divided into additional blocks, combined into fewer blocks, or eliminated, depending on the desired implementation. Processing may begin at block 610.

At block 610 (RECEIVE FIRST SENSOR DATA OF FIRST USER FROM FIRST DEVICE), virtual instrument playing system 500 (e.g., sensor data receiving unit 510) may receive first sensor data of a first user of virtual instrument playing system 500 from a first device. In some embodiments, the first sensor data may include angular velocity values obtained from a gesture-sensing device including a gyro sensor and/or an acceleration sensor (e.g., as gesture-sensing device 170 in FIG. 1). Processing may continue from block 610 to block 620.

At block 620 (RECEIVE SECOND SENSOR DATA OF FIRST USER FROM SECOND DEVICE), virtual instrument playing system 500 (e.g., sensor data receiving unit 510) may receive second sensor data of the first user from a second device. In some embodiments, the second sensor data of the first user may include skeleton data of the first user obtained from a camera including an RGB camera and a depth camera (e.g., as camera 130 in FIG. 1). Processing may continue from block 620 to block 630.

At block 630 (DETECT SOUND EVENT BASED ON FIRST SENSOR DATA), virtual instrument playing system 500 (e.g., sound event prediction unit 520) may detect a sound event based at least in part on the first sensor data of the first user. Processing may continue from block 630 to block 640.

At block 640 (PREDICT SOUND GENERATION TIMING OF SOUND EVENT BASED ON FIRST SENSOR DATA), virtual instrument playing system 500 (e.g., sound event prediction unit 520) may predict a sound generation timing corresponding to the sound event of the first user based at least in part on the first sensor data of the first user. In cases in which the first sensor data include the angular velocity values, virtual instrument playing system 500 may predict the sound generation timing based on either the pitch-based prediction or the gradient-based prediction. In some embodiments, virtual instrument playing system 500 may adaptively switch/select a prediction algorithm from multiple prediction algorithms including between the pitch-based prediction and the gradient-based prediction in accordance with the level of network delay observed. Processing may continue from block 640 to block 650.

At block 650 (IDENTIFY VIRTUAL INSTRUMENT OF SOUND EVENT BASED ON SECOND SENSOR DATA), virtual instrument playing system 500 (e.g., instrument identification unit 530) may identify a virtual instrument corresponding to the sound event from one or more virtual instruments based at least in part on the second sensor data of the first user. In cases in which the second sensor data include skeleton data of the first user obtained from the camera including the RGB camera and the depth camera, virtual instrument playing system 500 may identify the virtual instrument corresponding to the sound event at each sound generation timing based on the positions of the multiple virtual instruments in a virtual scene and the skeleton data obtained by skeleton tracking. Processing may continue from block 650 to block 660.

At block 660 (GENERATE SOUND DATA OF FIRST USER), virtual instrument playing system 500 (e.g., sound data generation unit 540) may generate sound data of the first user regarding the identified virtual instrument based at least in part on the sound generation timing. Processing may continue from block 660 to block 670.

At block 670 (GENERATE VIDEO DATA OF FIRST USER), virtual instrument playing system 500 (e.g., video data generation unit 550) may generate video data of the first user regarding the identified virtual instrument based at least in part on the second sensor data of the first user.

Figure 7:
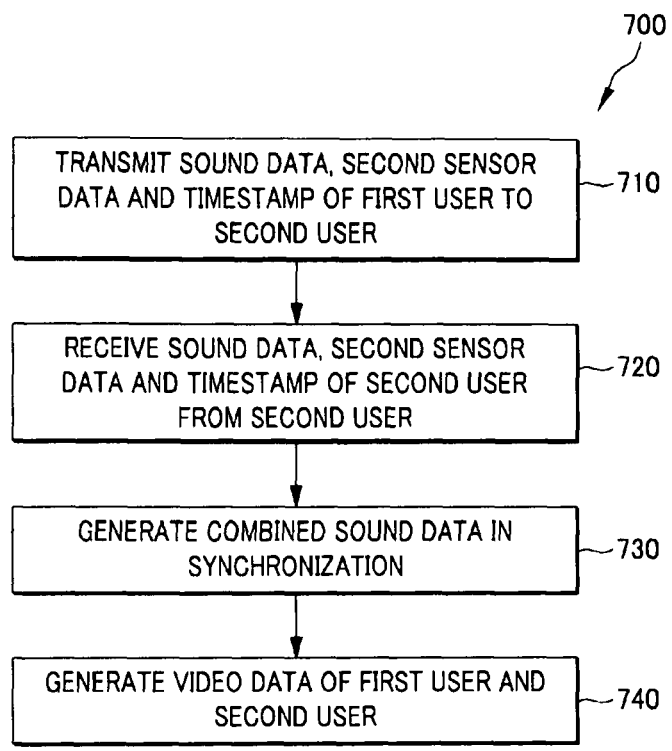
FIG. 7 shows an example flow diagram of a process for generating combined sound and video data for a virtual instrument playing scheme, arranged in accordance with at least some embodiments described herein.

FIG. 7 shows an example flow diagram of a process for generating combined sound and video data for a virtual instrument playing scheme, arranged in accordance with at least some embodiments described herein.

Process 700 may be implemented in a virtual instrument playing system such as virtual instrument playing system 500 including sensor data receiving unit 510, sound event prediction unit 520, instrument identification unit 530, sound data generation unit 540, video data generation unit 550, network interface 560 and synchronization unit 570. Further, process 700 may be performed with relation to and/or in subsequence of process 600. Process 700 may include one or more operations, actions, or functions as illustrated by one or more blocks 710, 720, 730 and/or 740. Although illustrated as discrete blocks, various blocks may be divided into additional blocks, combined into fewer blocks, or eliminated, depending on the desired implementation. Processing may begin at block 710.

At block 710 (TRANSMIT SOUND DATA, SECOND SENSOR DATA AND TIMESTAMP OF FIRST USER TO SECOND USER), virtual instrument playing system 500 (e.g., network interface 560) may transmit, to the remote virtual instrument playing system, a data packet including the sound data of the first user, the second sensor data of the first user and a timestamp of the first user indicating the sound generation timing of the sound data of the first user. Processing may continue from block 710 to block 720.

At block 720 (RECEIVE SOUND DATA, SECOND SENSOR DATA AND TIMESTAMP OF SECOND USER FROM SECOND USER), virtual instrument playing system 500 (e.g., network interface 560) may receive, from a remote virtual instrument playing system, a data packet that includes sound data of a second user of the remote virtual instrument playing system, visual sensor data of the second user and a timestamp of the second user indicating a sound generation timing of the sound data of the second user. The sound data of the remote user and its timestamp may be forwarded to synchronization unit 570 for synchronized playing with the sound data of the user of virtual instrument playing system 500, and the skeleton data of the remote user and its timestamp may be forwarded to video data generation unit 550 for generating a combined video scene of the user of virtual instrument playing system 500 and the remote user of the remote virtual instrument playing system. Processing may continue from block 720 to block 730.

At block 730 (GENERATE COMBINED SOUND DATA IN SYNCHRONIZATION), virtual instrument playing system 500 (e.g., sound data generation unit 540) may generate a combined sound data of the sound data of the first user and the sound data of the second user in synchronization based at least in part on the timestamp of the first user and the timestamp of the second user. Virtual instrument playing system 500 may then play the combined sound data. Processing may continue from block 730 to block 740.

At block 740 (GENERATE VIDEO DATA OF FIRST USER AND SECOND USER), virtual instrument playing system 500 (e.g., video data generation unit 550) may generate video data regarding the first user and the second user based at least in part on the second sensor data of the first user, the timestamp of the first user, the visual sensor data of the second user and the timestamp of the second user. Virtual instrument playing system 500 may then display the generated video data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
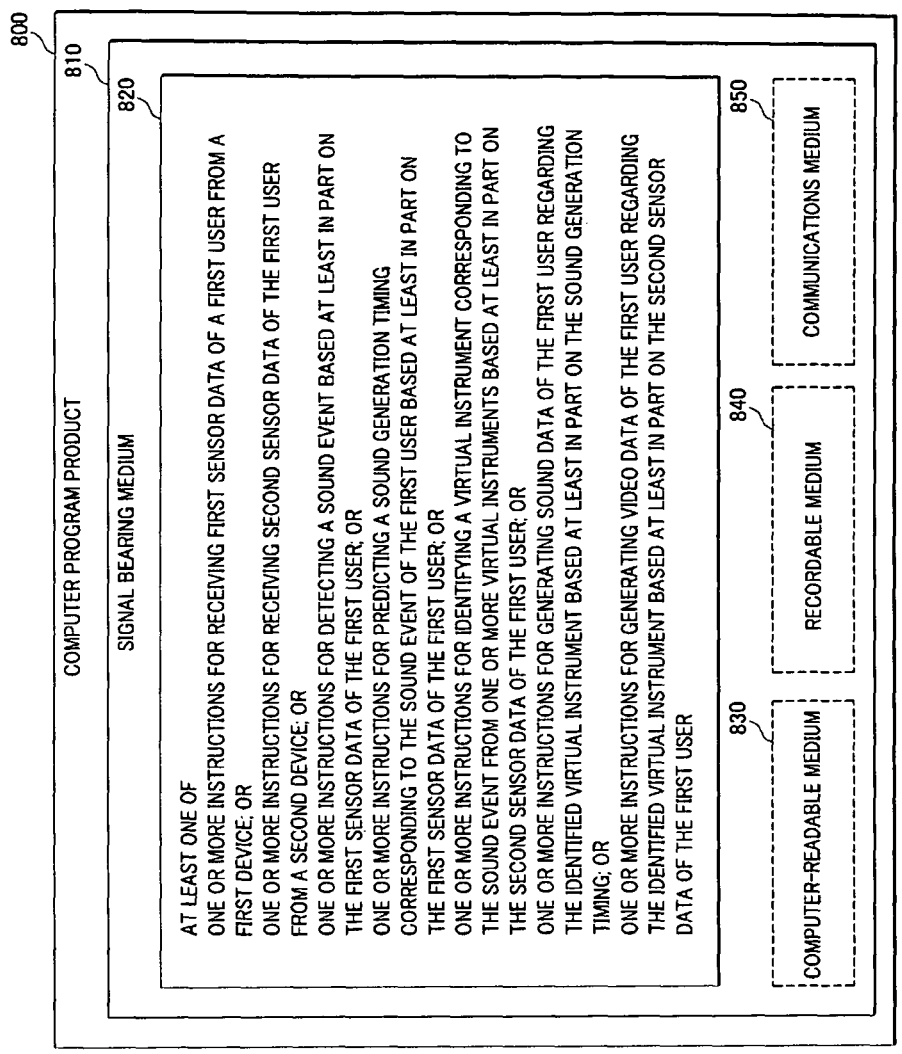
FIG. 8 illustrates an example computer program product that may be utilized to implement a virtual instrument playing scheme, arranged in accordance with at least some embodiments described herein.

FIG. 8 illustrates an example computer program product that may be utilized to implement a virtual instrument playing scheme, arranged in accordance with at least some embodiments described herein.

Program product 800 may include a signal bearing medium 810. Signal bearing medium 810 may include one or more instructions 820 that, when executed by, for example, a processor, may provide the functionality described above with respect to FIGS. 1-7. By way of example, instructions 820 may include: one or more instructions for receiving first sensor data of a first user from a first device; one or more instructions for receiving second sensor data of the first user from a second device; one or more instructions for detecting a sound event based at least in part on the first sensor data of the first user; one or more instructions for predicting a sound generation timing corresponding to the sound event of the first user based at least in part on the first sensor data of the first user; one or more instructions for identifying a virtual instrument corresponding to the sound event from one or more virtual instruments based at least in part on the second sensor, data of the first user; one or more instructions for generating sound data of the first user regarding the identified virtual instrument based at least in part on the sound generation timing; or one or more instructions for generating video data of the first user regarding the identified virtual instrument based at least in part on the second sensor data of the first user. Thus, for example, referring to FIG. 5, virtual instrument playing system 500 may undertake one or more of the blocks shown in FIG. 6 in response to instructions 820.

In some implementations, signal bearing medium 810 may encompass a computer-readable medium 830, such as, but not limited to, a hard disk drive, a CD, a DVD, a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communications link, a wireless communication link, etc.). Thus, for example, program product 800 may be conveyed to one or more modules of virtual instrument playing system 500 by an RF signal bearing medium 810, where the signal bearing medium 810 is conveyed by a wireless communications medium 850 (e.g., a wireless communications medium conforming with the IEEE 802.11 standard).

Figure 9:
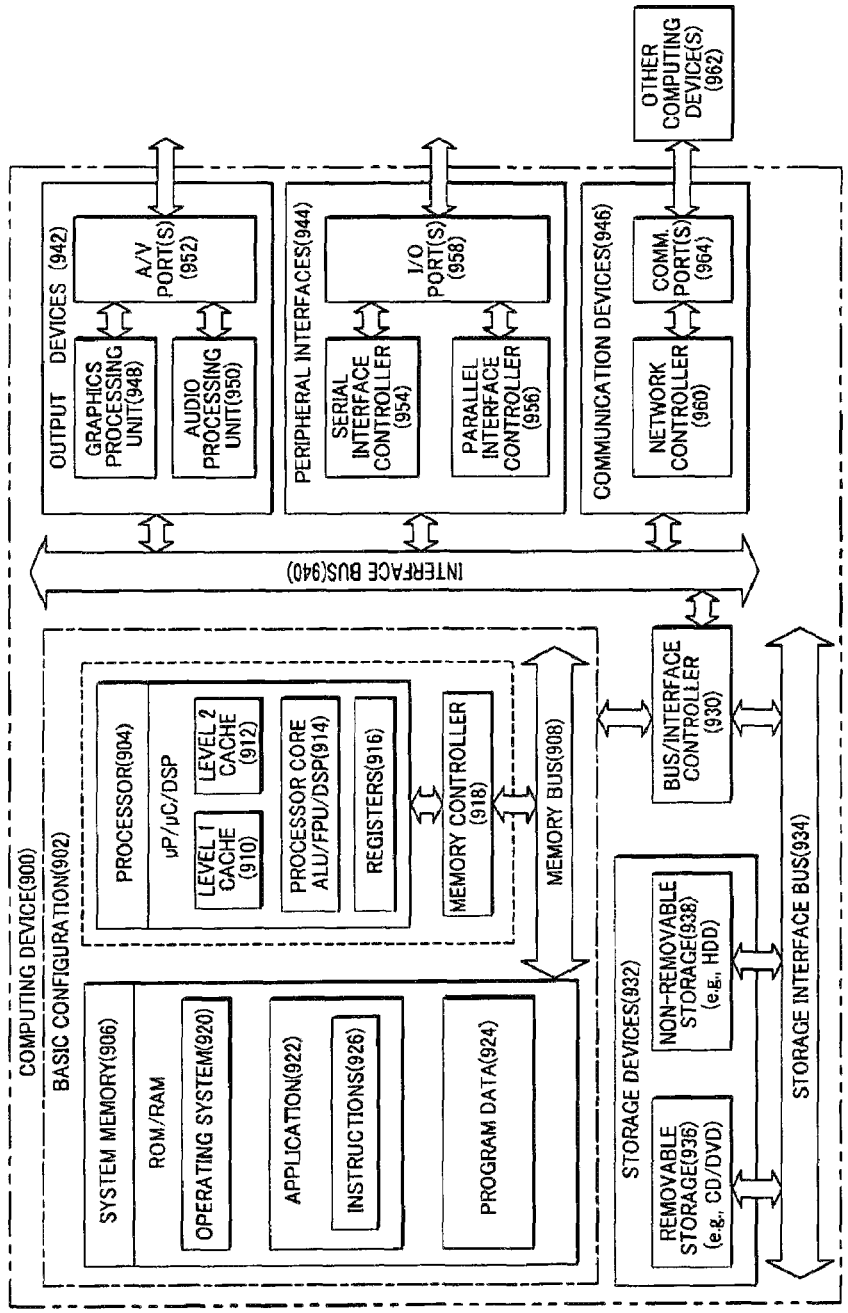
FIG. 9 is a block diagram illustrating an example computing device that may be utilized to implement a virtual instrument playing scheme, arranged in accordance with at least some embodiments described herein.

FIG. 9 is a block diagram illustrating an example computing device 900 that may be utilized to implement a virtual instrument playing scheme, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µR), a microcontroller (µC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include instructions 926 that may be arranged to perform the functions as described herein including the actions described with respect to the virtual instrument playing system 500 architecture as shown in FIG. 5 or including the actions described with respect to the flow charts shown in FIGS. 6 and 7. Program data 924 may include any data that may be useful for providing the spoiler alert scheme as is described herein. In some examples, application 922 may be arranged to operate with program data 924 on an operating system 920 such that the spoiler alert scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A virtual instrument playing system comprising:
   a sensor data receiving unit configured to receive first sensor data of a first user and second sensor data of the first user;
   a sound event prediction unit configured to detect a sound event of the first user and to predict a sound generation timing corresponding to the sound event of the first user based at least in part on the first sensor data of the first user;
   an instrument identification unit configured to identify a virtual instrument corresponding to the sound event from one or more virtual instruments based at least in part on the second sensor data of the first user;
   a sound data generation unit configured to generate sound data of the first user regarding the identified virtual instrument based at least in part on the sound generation timing; and
   a video data generation unit configured to generate video data of the first user regarding the identified virtual instrument based at least in part on the second sensor data of the first user.

2. The virtual instrument playing system of claim 1, wherein the first sensor data of the first user is obtained from at least one of a gyro sensor or an acceleration sensor, and the first sensor data of the first user includes angular velocity values, and
   wherein the second sensor data of the first user is obtained from at least one of a depth sensor or a video camera, and the second sensor data of the first user includes skeleton data of the first user.

3. The virtual instrument playing system of claim 2, wherein the sound event prediction unit is further configured to predict the sound generation timing based at least in part on at least one of a pitch of the angular velocity values or a gradient of the angular velocity values, and
   wherein the instrument identification unit is further configured to identify the virtual instrument corresponding to the sound event based at least in part on the skeleton data of the first user.

4. The virtual instrument playing system of claim 1, further comprising:
   a network interface configured to receive, from a remote virtual instrument playing system, a data packet that includes sound data of a second user, visual sensor data of the second user, and a timestamp of the second user indicating a sound generation timing of the sound data of the second user.

5. The virtual instrument playing system of claim 4, wherein the visual sensor data of the second user is obtained from at least one of a depth sensor or a video camera, and the visual sensor data of the second user includes skeleton data of the second user.

6. The virtual instrument playing system of claim 4, wherein the network interface is further configured to receive delay information of the second user from the remote virtual instrument playing system,
   wherein the sound event prediction unit is further configured to predict the sound generation timing corresponding to the sound event of the first user based at least in part on the delay information of the second user.

7. The virtual instrument playing system of claim 4, wherein the network interface is further configured to transmit, to the remote virtual instrument playing system, a data packet that includes the sound data of the first user, the second sensor data of the first user, and a timestamp of the first user indicating the sound generation timing of the sound data of the first user.

8. The virtual instrument playing system of claim 7, further comprising:
   a synchronization unit configured to generate a combined sound data of the sound data of the first user and the sound data of the second user in synchronization based at least in part on the timestamp of the first user and the timestamp of the second user.

9. The virtual instrument playing system of claim 8, wherein the virtual instrument playing system further comprises a sound interface configured to play the combined sound data.

10. The virtual instrument playing system of claim 7, wherein the video data generation unit is further configured to generate video data regarding the first user and the second user based at least in part on the second sensor data of the first user, the timestamp of the first user, the visual sensor data of the second user and the timestamp of the second user.

11. The virtual instrument playing system of claim 10, further comprising:
a video interface configured to play the generated video data.

12. A method performed under control of a virtual instrument playing system, comprising:
receiving first sensor data of a first user from a first device;
receiving second sensor data of the first user from a second device;
detecting a sound event based at least in part on the first sensor data of the first user;
predicting a sound generation timing corresponding to the sound event of the first user based at least in part on the first sensor data of the first user;
identifying a virtual instrument corresponding to the sound event from one or more virtual instruments based at least in part on the second sensor data of the first user;
generating sound data of the first user regarding the identified virtual instrument based at least in part on the sound generation timing; and
generating video data of the first user regarding the identified virtual instrument based at least in part on the second sensor data of the first user.

13. The method of claim 12, wherein the first device includes at least one of a gyro sensor or an acceleration sensor, and the first sensor data of the first user includes angular velocity values, and
wherein the second device includes at least one of a depth sensor or a video camera, and the second sensor data of the first user includes skeleton data of the first user.

14. The method of claim 12, wherein the predicting of the sound generation timing corresponding to the sound event of the first user is further based at least in part on at least one of a pitch of the angular velocity values or a gradient of the angular velocity values, and
wherein the identifying of the virtual instrument corresponding to the sound event is further based at least in part on the skeleton data of the first user.

15. The method of claim 12, further comprising:
receiving, from a remote virtual instrument playing system, a data packet that includes sound data of a second user, visual sensor data of the second user, and a timestamp of the second user indicating a sound generation timing of the sound data of the second user, and
wherein the visual sensor data of the second user is obtained from at least one of a depth sensor or a video camera, and the visual sensor data of the second user includes skeleton data of the second user.

16. The method of claim 15, further comprising:
receiving delay information of the second user from the remote virtual instrument playing system,
wherein the predicting of the sound generation timing corresponding to the sound event of the first user is further based at least in part on the delay information of the second user.

17. The method of claim 15, further comprising:
generating a data packet including the sound data of the first user, the second sensor data of the first user, and a timestamp of the first user indicating the sound generation timing of the sound data of the first user; and
transmitting the data packet to the remote virtual instrument playing system.

18. The method of claim 17, further comprising:
generating a combined sound data of the sound data of the first user and the sound data of the second user in synchronization based at least in part on the timestamp of the first user and the timestamp of the second user; and
playing the combined data.

19. The method of claim 17, further comprising:
generating video data regarding the first user and the second user based at least in part on the second sensor data of the first user, the timestamp of the first user, the visual sensor data of the second user and the timestamp of the second user; and
playing the generated video data.

20. A non-transitory computer-readable storage medium having stored thereon computer-executable instructions that, in response to execution, cause a virtual instrument playing system to perform operations, comprising:
receiving first sensor data of a first user from a first device;
receiving second sensor data of the first user from a second device;
detecting a sound event based at least in part on the first sensor data of the first user;
predicting a sound generation timing corresponding to the sound event of the first user based at least in part on the first sensor data of the first user;
identifying a virtual instrument corresponding to the sound event from one or more virtual instruments based at least in part on the second sensor data of the first user;
generating sound data of the first user regarding the identified virtual instrument based at least in part on the sound generation timing; and
generating video data of the first user regarding the identified virtual instrument based at least in part on the second sensor data of the first user.

21. The computer-readable storage medium of claim 20, wherein the first device includes at least one of a gyro sensor or an acceleration sensor, and the first sensor data of the first user includes angular velocity values, and the predicting of the sound generation timing corresponding to the sound event of the first user is further based at least in part on at least one of a pitch of the angular velocity values or a gradient of the angular velocity values, and
wherein the second device includes at least one of a depth sensor or a video camera, and the second sensor data of the first user includes skeleton data of the first user, and the identifying of the virtual instrument corresponding to the sound event is further based at least in part on the skeleton data of the first user.

22. The computer-readable storage medium of claim 20, wherein the operations further comprise:
receiving, from a remote virtual instrument playing system, a data packet that includes sound data of a second user, visual sensor data of the second user, and a timestamp of the second user indicating a sound generation timing of the sound data of the second user, and
wherein the visual sensor data of the second user is obtained from at least one of a depth sensor or a video camera, and the visual sensor data of the second user includes skeleton data of the second user.

23. The computer-readable storage medium of claim 22, wherein the operations further comprise:
receiving delay information of the second user from the remote virtual instrument playing system,
wherein the predicting of the sound generation timing corresponding to the sound event of the first user is further based at least in part on the delay information of the second user.

24. The computer-readable storage medium of claim 22, wherein the operations further comprise:
- generating a combined sound data of the sound data of the first user and the sound data of the second user in synchronization based at least in part on the timestamp of the second user and a timestamp of the first user indicating the sound generation timing of the sound data of the first user; and
- generating video data regarding the first user and the second user based at least in part on the second sensor data of the first user, the timestamp of the first user, the visual sensor data of the second user and the timestamp of the second user.

\* \* \* \* \*